United States Patent [19]

Härtel et al.

[11] Patent Number: 4,880,216

[45] Date of Patent: Nov. 14, 1989

[54] TWO-CHAMBER ENGINE BEARING WHICH HAS HYDRAULIC DAMPING

[75] Inventors: Volker Härtel, Germering; Dieter Theisen, Lohhof; Günter Oppermann, Leverkusen, all of Fed. Rep. of Germany

[73] Assignee: Metzeler Kautschuk GmbH, Munich, Fed. Rep. of Germany

[21] Appl. No.: 659,714

[22] Filed: Oct. 11, 1984

[30] Foreign Application Priority Data

Oct. 11, 1983 [DE] Fed. Rep. of Germany ....... 3336965

[51] Int. Cl.$^4$ .......................... F16F 13/00; B60K 5/12
[52] U.S. Cl. .................................. 267/140.1; 252/21; 252/24; 267/219
[58] Field of Search .................. 267/8 R, 63 A, 140.1, 267/153, 35, 219; 188/268, 322.5, 267; 252/71, 74, 77; 585/6.3, 6.6

[56] References Cited

U.S. PATENT DOCUMENTS 2,886,151 5/1959 Winslow ........................... 252/75 X
3,047,507 7/1962 Winslow ............................... 252/74

FOREIGN PATENT DOCUMENTS 3019337 11/1981 Fed. Rep. of Germany .
58-57536 4/1983 Japan ................................. 188/267
1282568 7/1972 United Kingdom ................. 188/268

Primary Examiner—Andres Kashnikow
Assistant Examiner—Matthew C. Graham
Attorney, Agent, or Firm—Herbert L. Lerner; Laurence A. Greenberg

[57] ABSTRACT

The invention relates to a two-chamber bearing, in particular for motor vehicles, which has hydraulic damping, the liquid-filled chambers of which have rubber elastic peripheral walls and are connected to each other by a line which is provided in a rigid intermediate plate. According to the present invention, a so-called active bearing is provided which can be rapidly adapted to the operational conditions in each case by filling the chambers with an electroviscous liquid, the viscosity of which may be controlled by applying an electrical field in the area of the line which passes through the intermediate plate.

4 Claims, 1 Drawing Sheet

4,880,216 ration"
TWO-CHAMBER ENGINE BEARING WHICH HAS HYDRAULIC DAMPING

The present invention relates to a two-chamber engine bearing, in particular for motor vehicles, which has hydraulic damping, the liquid-filled chambers of which have rubber-elastic peripheral walls and are connected to each other by a line which is provided in a rigid intermediate plate.

Engine bearings of this type are known, for example, from DE-OS 30 19 337 corresponding to U.S. Pat. No. 4,442,779. They do not generally respond hydraulically to high-frequency vibrations which have a small amplitude, with the result that these vibrations are only slightly damped, whereas there is an increased level of damping caused by the increasing exchange of liquid through the line which passes through the intermediate plate, in the case of vibrations of a decreasing frequency and an increasing amplitude. Optimization can, however, only be achieved for a specific frequency-range, depending on the length and size of this line and the viscosity of the liquid which is used. This frequency-range is thus relatively narrow with the result that a specific type of bearing has to be designed for any extraordinary load. Thus, bearings of this type which are hydraulically damped, are passive damping elements which have a predetermined reaction at a specific load without there being a means of regulating or controlling this in the bearing itself.

Accordingly, the present invention sets out to provide an engine bearing which is hydraulically damped, the damping level of which may be to a large extent adapted to the requirements of each case without any moveable parts being necessary.

This object is achieved according to the present invention using the above-mentioned prior art as a base and filling the chambers with an electroviscous liquid, the viscosity of which may be controlled by creating an electric field in the area of the line which passes through the intermediate plate.

Electroviscous liquids of this type are known in principle, for example, from U.S. Pat. Nos. 2,886,151 and 3,047,507. When a current is applied or when an electric field is created, these liquids change their viscosity and therefore, depending upon the size of the field, may be thin-flowing, thick-flowing or even virtually solid.

If an electroviscous liquid of this type is used in an engine bearing of the above-mentioned design, the damping level and the dynamic rigidity may be set by appropriately adjusting the viscosity of the hydraulic liquid and adapting it exactly to the load conditions in each case.

In the design, the present invention is effective if the line is formed by two plate electrodes arranged parallel to each other at a spacing from ech other inside the intermediate plate, which are connected to a power source, the breadth of the plate electrodes and their spacing from each other delimiting the cross-section of the line, and if the inside of the line has a passage to the upper chamber at one end and a passage to the lower chamber at the other end. The passages themselves may be slit-shaped and span the entire width of the electrode plates.

The current which is applied to the plate electrodes may be regulated as a function of the engine speed as a reference parameter for the damping level required in each case. It is, however, possible for the electrode current to be regulated using on-line measurement as a function of the vibrating conditions in each case. Correspondingly the acceleration of the mounting points of the engine is determined for this purpose.

A mixture of from 40-60% by weight of silica or silicic acid, from 30-50% by weight of an organic liquid having a suitable boiling point, from 5-10% by weight of water and 5% by weight of a dispersing agent is particularly suitable as the electroviscous liquid.

The structure and operation of an embodiment according to the present invention are described in more detail with reference to the diagrammatical drawings.

Figure 1:
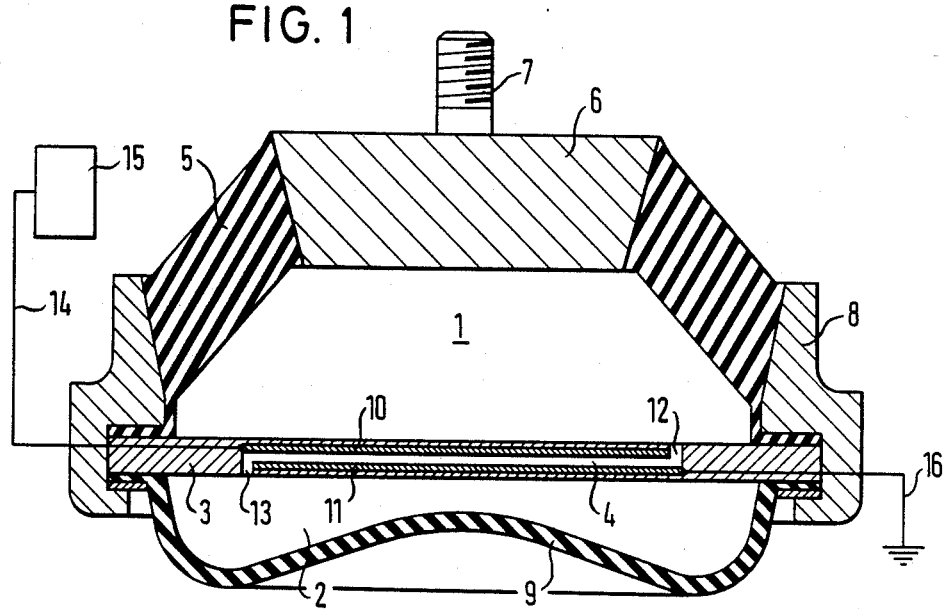
FIG. 1 shows a longitudinal section through a two-chamber engine bearing.

As can be seen from FIG. 1, the two-chamber engine bearing conventionally comprises an upper chamber 1 and a lower chamber 2 which are hydraulically connected to each other by a line 4 which passes through the intermediate plate 3 which has yet to be described. The upper chamber 1 is formed by a strong-walled, hollow, conical chamber wall 5 of rubber-elastic material, the upper face of which chamber wall 5 is connected in an adhesive manner to a bearing plate 6 on which the engine may, for example, be fixed by a bolt 7 and the bottom of which is connected in an adhesive manner to the mounting flange 8 as a connection to an abutment which is not shown in detail. The lower chamber 2 is formed by a chamber wall 9 of rubber-elastic, albeit softer material, which may, for example, be cup-shaped and is also connected in an adhesive manner to the flange 8.

The line 4 for hydraulically connecting the two chambers 1 and 2 in the intermediate plate 3 is formed by two metallic plates 10 and 11, which are embedded at a spacing from each other in an appropriate cavity of the intermediate plate 3, the spacing and width of the plates thus delimiting the cross-section of the line 4. A vertical passage 12 into the upper chamber 1 is provided at one end of plates 10 and 11 and likewise a vertical passage 13 into the lower chamber is provided at the other end.

Figure 2:
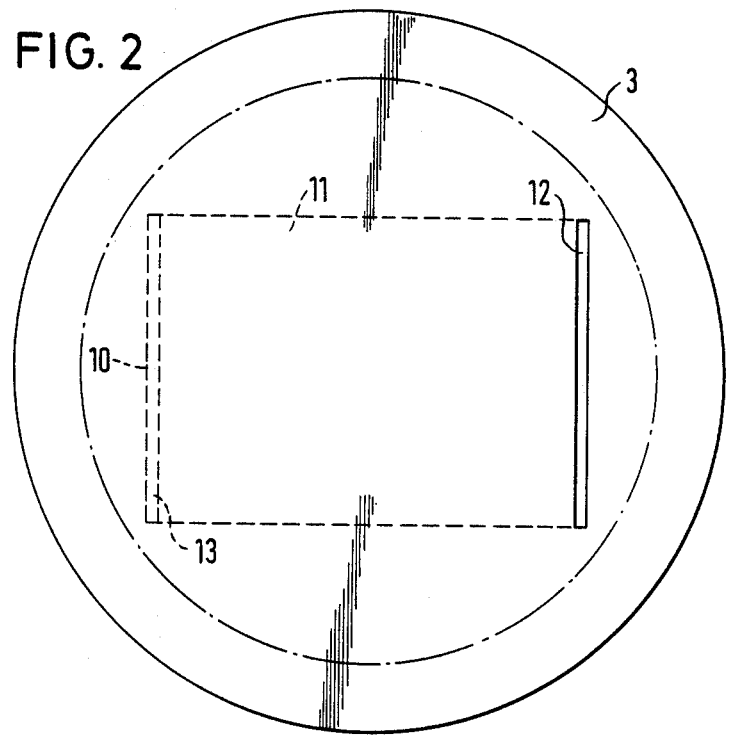
FIG. 2 shows a top view of the intermediate plate of the bearing.

As can be seen from the top view of the intermediate plate 3 in FIG. 2, plates 10 and 11 respectively are effectively rectangular, corresponding to the dotted line and end at the slit-shaped passages 12 and 13 respectively which span the entire width of these plates.

The plate 10, which acts as the upper electrode is, moreover, connected to a controllable power source 15 by an insulated line 14, which is guided outwards, while the plate 11, which acts as the lower electrode is grounded by a line 16 which is also insulated.

Both chambers 1 and 2 are filled with an electroviscous liquid, which may, for example, consist of a mixture of from about 40-60% by weight of silica as solid substance, from 30-50% by weight of a suitable organic liquid which has a low dielectric constant, such as isodecane, from 5-10% by weight of water and about 5% by weight of a dispersing agent.

This electroviscous liquid firstly acts as a conventional hydraulic liquid and then, when appropriate vibrations which have a large amplitude and low frequency occur, it flows from the upper chamber 1 via the line 4 into the lower chamber 2, the displacement of the quantity of liquid contained in the line 4 producing a corresponding choking action. If an electric current is applied to the two electrodes 10 and 11, the viscosity of the liquid in the line 4 is altered so that the bearing has a different damping behavior on account of the flow conditions which have thereby been changed. When the current reaches an appropriate height, the electroviscous liquid may become so solid that it is no longer possible for it to pass through the line 4.

This means therefore that by controlling the viscosity of the hydraulic liquid, it is not only possible to adjust the level of damping and the dynamic rigidity of the bearing, but to adapt them to any load conditions. A particularly high level of damping is achieved if the line virtually closes as the bearing is spring-deflected and opens when the upper chamber is released or re-expands, because the most energy is thereby extracted.

Speed-dependent control using a tachometer may, for example, be used to adjust the desired damping, the damping decreasing as the speed increases. The highest level of damping should effectively lie in the region of the self-resonances which are produced. In this manner, drive mechanism movements of a great amplitude are effectively damped while in the region of high frequencies the bearing may be adjusted, by suitable electrically-controlled decoupling, onto an acoustically favorable dynamic system behavior.

A further means of regulating this is, for example, to determine the acceleration of the attachment points or forces or displacements and differences in displacements respectively, which have been produced using on-line measurement of the position of the bearing and in each case to produce the corresponding current by a suitable control algorithm to produce an optimum degree of energy extraction and damping by the viscosity of the liquid which is thereby achieved.

By means of the design according to the present invention, and by using an electroviscous liquid as a hydraulic medium, an active engine bearing may thus be produced which does not have moving parts and with which the level of damping may be very rapidly adjusted to the loads produced within a wide frequency-range; this is particularly the case because the reaction time for a change in the viscosity of the liquid is several milliseconds and it is thus possible to achieve a real-time processing of the signal and an intermediate alteration to the damping behavior of the bearing.

We claim:

1. Two-chamber engine bearing with hydraulic damping, comprising rubber-electric peripheral walls, a rigid intermediate plate defining upper and lower chambers along with said peripheral walls, said intermediate plate mechanically separating said chambers from each other, two mutually parallel flat plate electrodes disposed in said intermediate plate, said plate electrodes having a given width and being spaced apart from each other by a given distance defining a line therebetween with a given cross section and two ends, said line having two slot-shaped passages formed therein each connecting a respective one of said ends of said line with a respective one of said chambers, a hydraulic electroviscous liquid filling and interconnecting said chambers through said line, and a voltage source connected to said plate electrodes for generating an electric field controlling the viscosity of said liquid.

2. Two-chamber engine bearing according to claim 1, wherein said passages span the entire given width of said electrode plates.

3. Two-chamber engine bearing according to claim 1, wherein said electroviscous liquid is formed of a mixture of from 40–60% by weight of silica, from 30–50% by weight of an organic liquid which has low electric constants, from 5–10% by weight of water and substantially 5% by weight of a dispersing agent.

4. Two-chamber engine bearing according to claim 3, wherein said organic liquid is formed of isododecane.

* * * * *